United States Patent [19]

Frielingsdorf et al.

[11] Patent Number: 5,054,079

[45] Date of Patent: Oct. 1, 1991

[54] BONE CONDUCTION MICROPHONE WITH MOUNTING MEANS

[75] Inventors: Frank Frielingsdorf, Port Jefferson; Alan Hofer, Wantagh, both of N.Y.; Peter Untersander, Ecoteaux, Switzerland

[73] Assignee: Stanton Magnetics, Inc., Plainview, N.Y.

[21] Appl. No.: 470,147

[22] Filed: Jan. 25, 1990

[51] Int. Cl.[5] ........................ H04R 25/00; H04M 1/00

[52] U.S. Cl. ........................ 381/151; 379/430; 381/169; 381/205

[58] Field of Search .................. 379/430; 381/88, 151, 381/157, 169, 187, 188, 200, 205

[56] References Cited

U.S. PATENT DOCUMENTS

| | | | |
|---|---|---|---|
| 3,723,670 | 3/1973 | Sebesta et al. | 379/430 |
| 3,733,445 | 5/1973 | Sebesta et al. | 381/200 |
| 3,787,641 | 1/1974 | Santori | 381/151 |
| 4,295,009 | 10/1981 | Weidler | 381/205 |
| 4,607,383 | 8/1986 | Ingalls | 381/88 |

FOREIGN PATENT DOCUMENTS

| | | | |
|---|---|---|---|
| 1187678 | 2/1965 | Fed. Rep. of Germany | 381/151 |
| 0019730 | 2/1979 | Japan | 381/151 |
| 0664659 | 3/1988 | Switzerland | 381/169 |

*Primary Examiner*—Jin F. Ng
*Assistant Examiner*—William Cumming
*Attorney, Agent, or Firm*—Kane, Dalsimer, Sullivan, Kurucz, Levy, Eisele and Richard

[57] ABSTRACT

A microphone assembly for mounting in a head gear of a person includes a microphone positioned in intimate contact with the person for receiving vibrations from the vocal cords by bone conduction, a housing for holding the microphone, a mounting ring for mounting the housing to the head gear and a damper element disposed between the microphone and the head gear for damping extraneous sides transmitted through the headgear before they are picked up by the microphone.

10 Claims, 7 Drawing Sheets

BONE CONDUCTION MICROPHONE WITH MOUNTING MEANS

BACKGROUND OF THE INVENTION

1. Field of Invention

This invention pertains to a bone conduction microphone mounting system and more particularly, to a system having a bone conduction microphone or transducer for converting sounds into electrical signals, and mounting means including damper means for isolating the transducer from extraneous vibrations.

2. Description of the Prior Art

Bone conduction microphones pick up vibrations in the cranial bones of a person corresponding to sounds produced by the vocal cords and are used often for enhancement and amplification of speech in various systems. For examples, they may be incorporated into a personal speaker/amplifier system. As a result of various illnesses, some persons suffer from a partial disfunction of their vocal cords whereby they can produce only sounds of relatively low level which are not projected far enough for other people to hear, or which cannot be sensed by other audio instruments such as a telephone. In order to alleviate this problem, personal speaker/amplifier systems have been proposed with a bone conduction microphone which picks up these low level sounds and converts them to electrical signals. Other elements of the system amplify the electrical signals, reproduce them as sounds, and project them in a manner imitating normal speech.

Bone conduction microphones are also used in communication systems for transmission of speech from very noisy environments such as, for example, helicopters as illustrated in U.S. Pat. Nos. 3,787,641 and 3,723,670.

One problem with prior art bone conduction microphone systems is that they are supported by a mounting system, secured for example on a headband or inside a helmet. However, extraneous mechanical vibrations can be picked up by the microphone from the headband or helmet through the mounting system resulting in noise superimposed on the speech signals.

OBJECTIVES AND SUMMARY OF THE INVENTION

In view of the above-mentioned disadvantage of the prior art, it is an objective of the present invention to provide a bone conduction microphone system with a mounting means including sound dampening for isolating the microphone itself from extraneous vibration from its connecting cable.

A further objective is to provide a bone conduction microphone system with mounting means including damping means which can be manufactured relatively inexpensively. Other objectives and advantages of the invention shall become apparent form the detailed description below.

Briefly, a bone conduction microphone system constructed in accordance with this invention includes a housing for positioning a transducer in intimate contact with the cranial bones of a person for generating electrical signals transmitted through the bones corresponding to sounds produced by the vocal cords, a cable coupled to the transducer for transmitting the electrical signals for further signal processing, and interposing support means connected to said housing for mounting said housing on a headband or helmet. The system further includes damper means made preferably of a resilient material disposed between the interposing structure and the housing to intercept and dampen vibration from outside to the microphone. In an alternate embodiment, the transducer is disposed on a flexible housing so that it essentially floats with respect to the interposing structure.

DETAILED DESCRIPTION OF THE INVENTION

Figure 1:
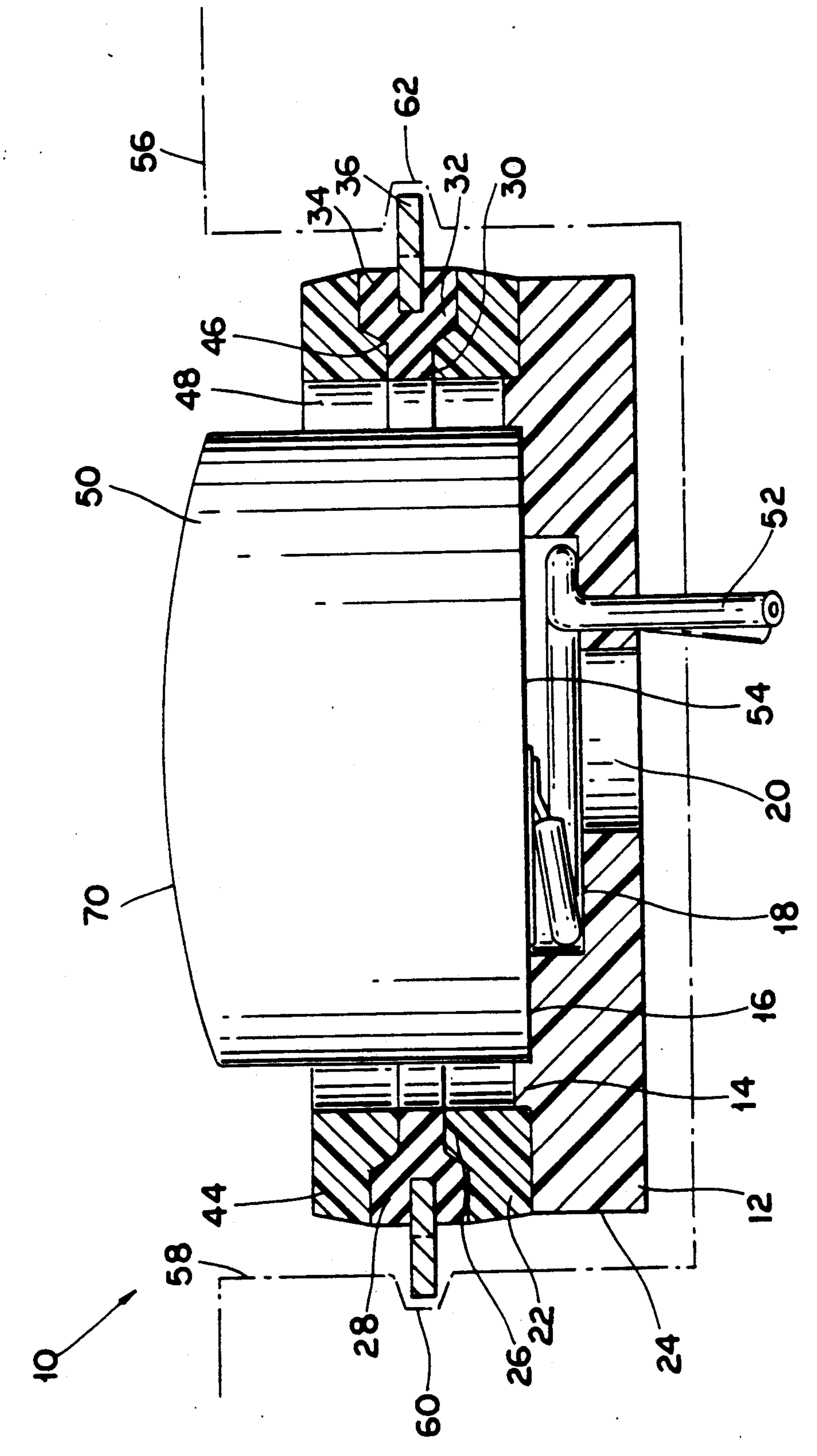
FIG. 1 shows a sectional view of bone conduction microphone system with mounting assembly incorporating a microphone and damper constructed in accordance with this invention.
Figure 2:
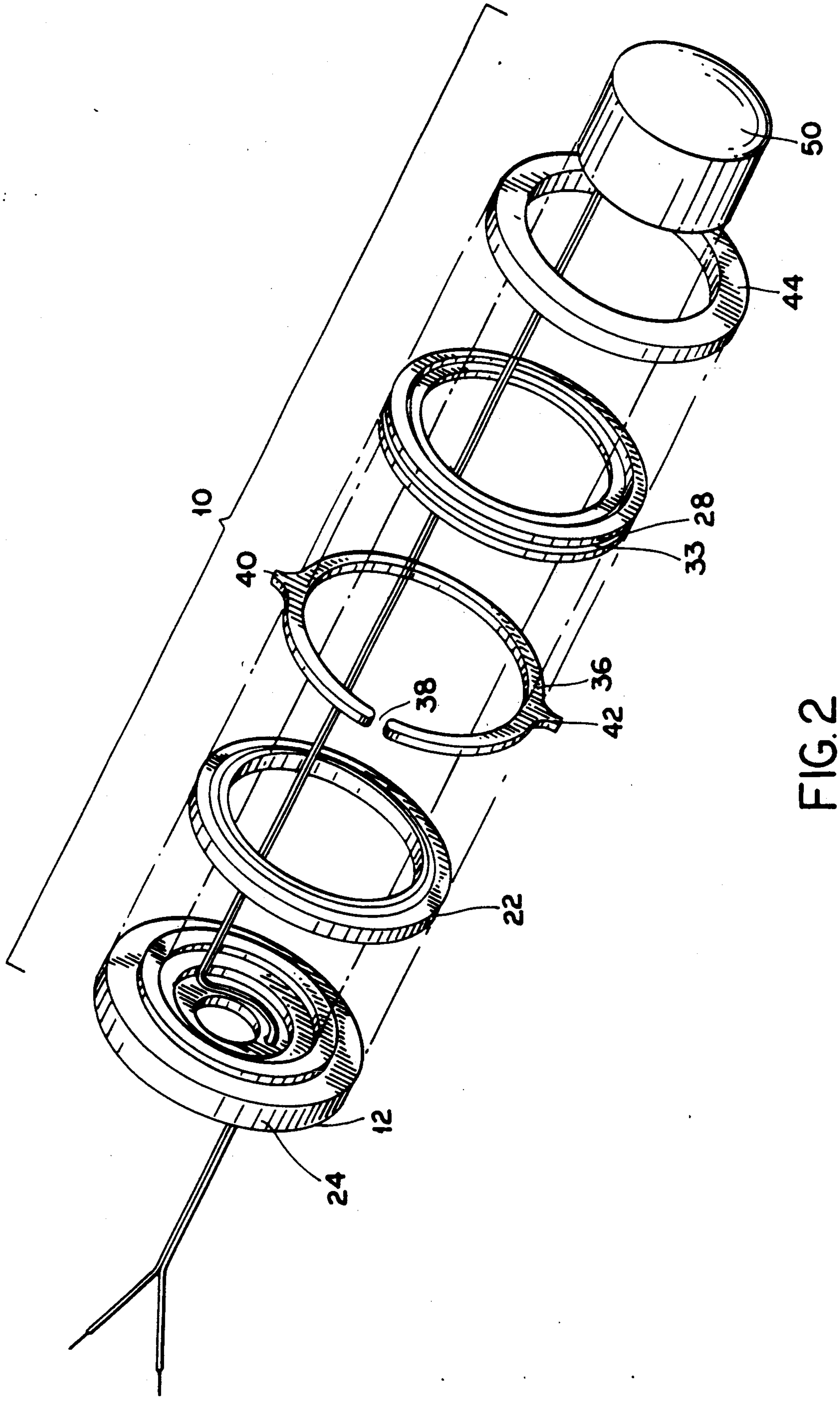
FIG. 2 shows an exploded view of the invention of FIG. 1.
Figure 3:
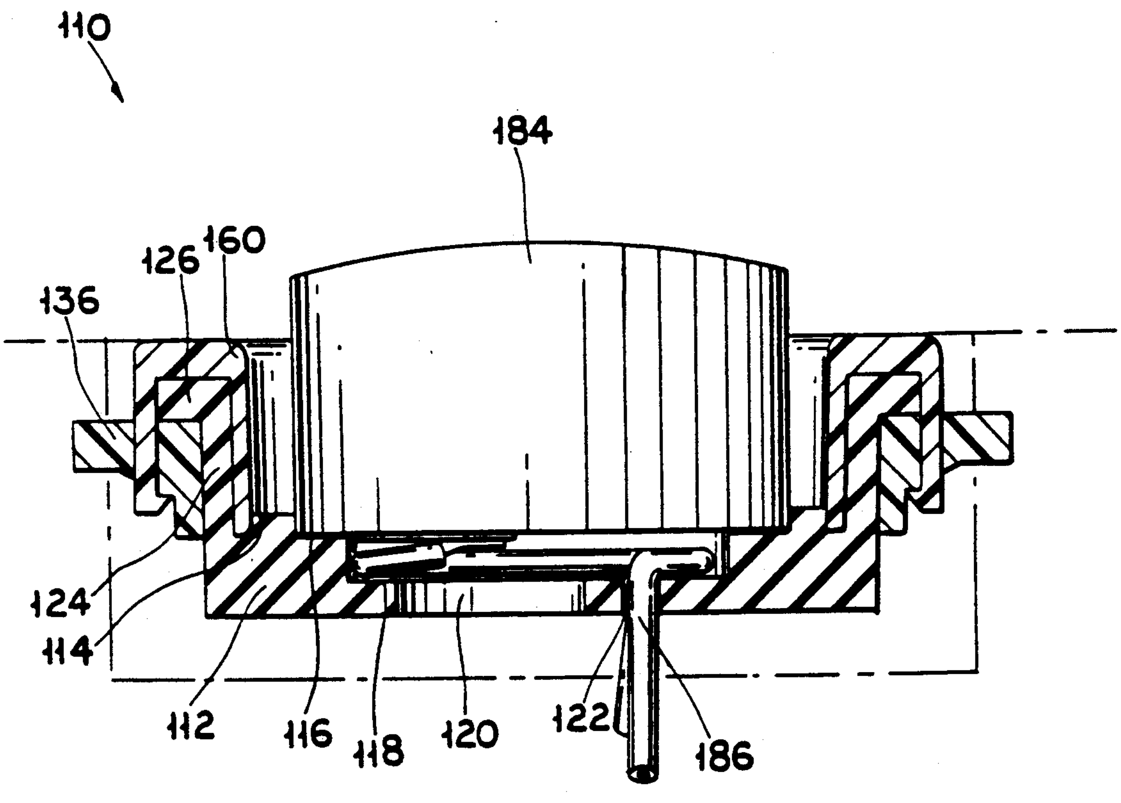
FIG. 3 shows a cross-sectional view of an alternate embodiment of the invention.
Figure 4:
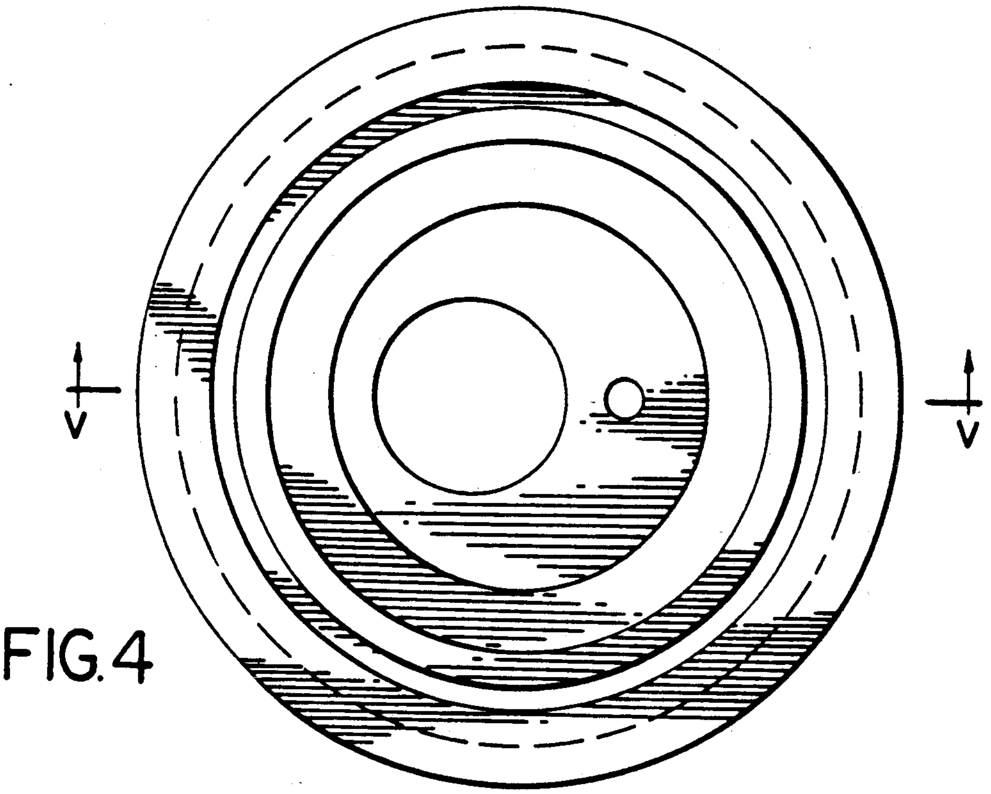
FIG. 4 shows a plane view of the cup of the alternate embodiment of FIG. 3.
Figure 5:
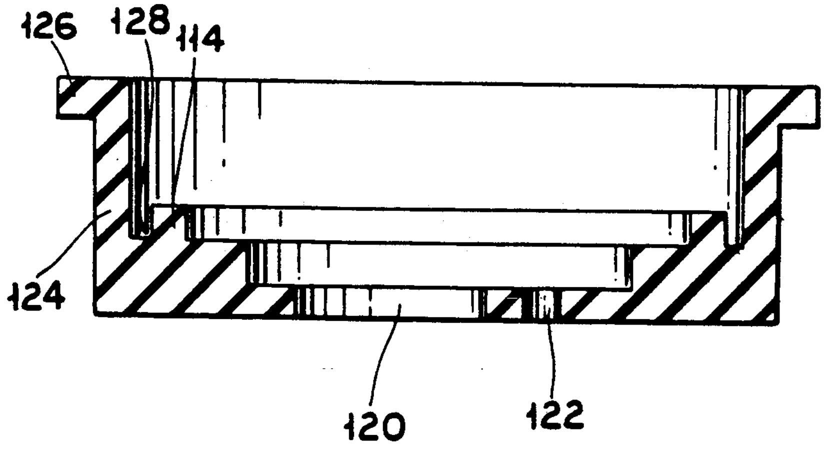
FIG. 5 shows a cross-sectional view of the cup of FIG. 4.

Referring now to FIGS. 1–3, a bone conduction microphone assembly 10 constructed in accordance with one embodiment of this invention consists of disk-shaped base 12. The base includes an annular ridge 14 disposed on a top surface 16, an inner ledge 18 and a central opening 20 concentric with the base 12. Above, the base there is a first spacer ring 22 preferably having a width (in the radial direction) selected so that this ring 22 is substantially between ridge 14 and the outer surface 24 of base 12, as shown in FIG. 1. Ring 22 also has in inner upper ridge 26 disposed circumferentially around its inside perimeter.

Disposed above spacer ring 22 is a damper ring 30. This damper ring has a substantially Y-shaped cross-section defined by an inner annular leg 30, a lower annular arm 32 and an upper annular arm 34 to form an annular grove 33 therebetween. Disposed between the two annular arms 32, 34 is a pivot ring 36. This pivot ring is generally C-shaped with a gap as at 38. On two diametrically opposite points along its circumference, ring 36 is provided with two extensions 40 directed radially outwardly.

On top of the ring 36, there is second spacer ring 44 substantially identical to ring 22, with an inner annular lower ridge 46.

Base 12, and spacer rings 22, 24, are preferably made of a moldable plastic relatively hard, inflexible material such as PVC. Damper ring 34 is made of a very resilient, rubber like material such as neoprene. Finally, pivot ring 36 is made of a hard, somewhat flexible material such as stainless steel.

The above-described elements are first assembled and secured to each other by a rubber cement or similar suitable adhesive, to form a housing with a substantially cylindrical cavity 48. An induction microphone or other similar inertial transducer 50 is then placed in the cavity 48 and seated inside ridge 14. The microphone maybe secured to surface 16 by an adhesive. The microphone may be similar for example to the one described in U.S. Pat. No. 4,843,628. The electrical signals from the microphone 50 are transmitted through a pair of wires 52. The microphone 50 and ledge 18 form an annular space 54 for holding wires 52 in a coil. As shown in FIG. 1, the resulting microphone assembly has a substantially cylindrical shape with the exception of extensions 40, 42.

The completed microphone assembly is now ready for installation in a head gear such as headband or helmet. In FIG. 1, a portion of a helmet 56 in outline, with a cylindrical microphone cavity 58 for holding the microphone assembly. This cavity 58 has a diameter which is slightly larger than the outer diameter of the assembly 10. On the sidewall of the cavity two depressions 60, 62 are provided to correspond to extensions 40, 42. Because of the resilience of damper ring 34, as the assembly 10 is inserted into cavity 58, extensions 40, 42 are pressed together until they snapped into depressions 60, 62 thereby securing the assembly. In this position, an outer contact surface 70 of microphone 50 extends above cavity 58 as shown.

The microphone assembly installed in a head gear such as helmet as described above operates as follows. When a person puts on the helmet contact surface 70 of microphone 50 is positioned to come into intimate contact with the cranial bones of the wearer. When the person speaks, his audible signals are a transmitted by the cranial bones to microphone 50 through contact surface 70. The microphone 50 converts these audible signals into corresponding electrical signals, which are then transmitted through wires 52 for amplification. Importantly, extraneous audible signals, generated for example by rubbing between the helmet and other objects may propagate through helmet to pivot ring 36 but are substantially absorbed by damper ring 34 and base 12 so that they are not picked up by microphone 50. The assembly may be mounted on a headband in a similar manner.

The alternate embodiment of FIGS. 3–12 shall now be described. In this somewhat preferred embodiment of the invention, a bone conduction microphone assembly 110 consists of a cup 112 shown in detail in FIGS. 4 and 5 and including an annular ridge 114 surrounding a top surface 116. An inner ledge 118 is formed in the cup with a somewhat offset hole 120 and a wire opening 122.

Surrounding ridge 114 there is a cylindrical wall 124 extending upwardly with respect to surface 116. The wall terminates in an enlarged rim 126. A circumferential groove 128 is formed between wall 124 and ridge 114 as shown. Cup 112 is made of a relatively soft, flexible material such as neoprene or synthetic rubber.

Figure 6:
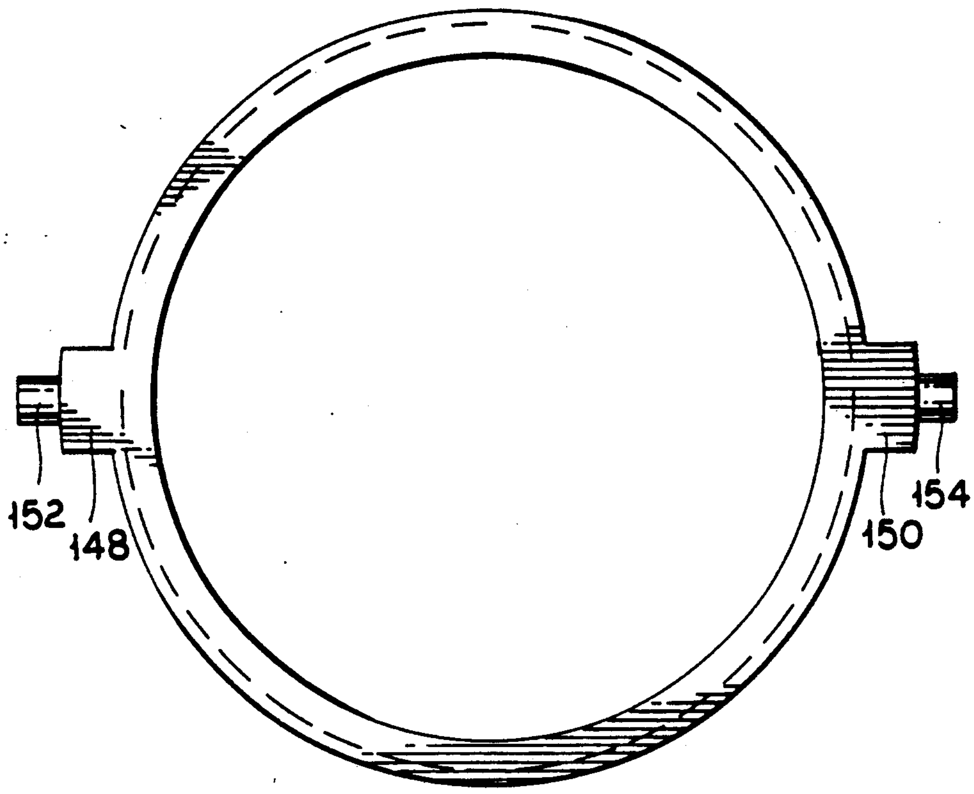
FIG. 6. shows a plan view of the retainer ring for the embodiment of FIG. 3.
Figure 7:
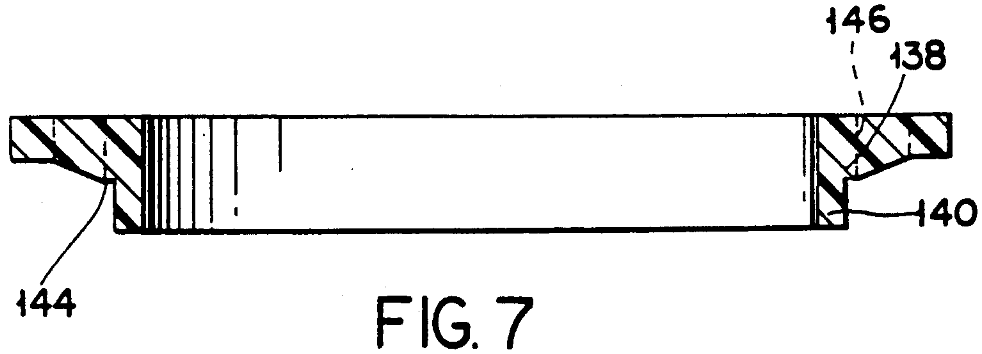
FIG. 7 shows a sectional view of the retainer ring of FIG. 6.
Figure 8:
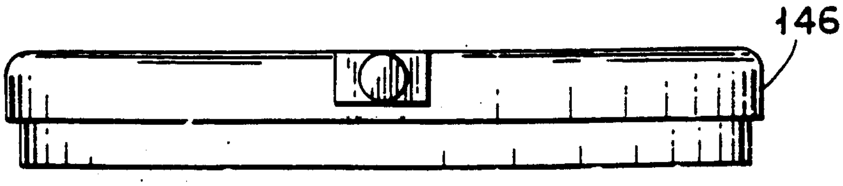
FIG. 8 shows a side view of the retainer ring of FIG. 6.
Figure 9:
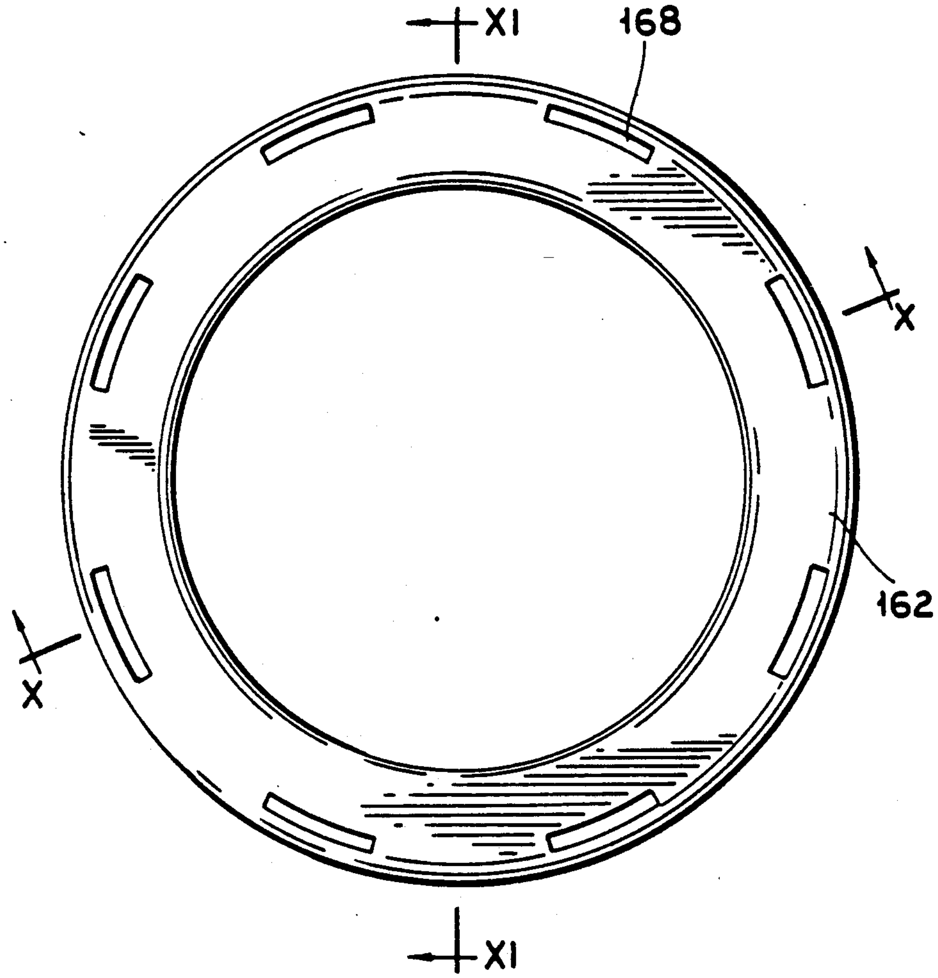
FIG. 9 shows a top view of the cap for the embodiment of FIG. 3.
Figure 10:
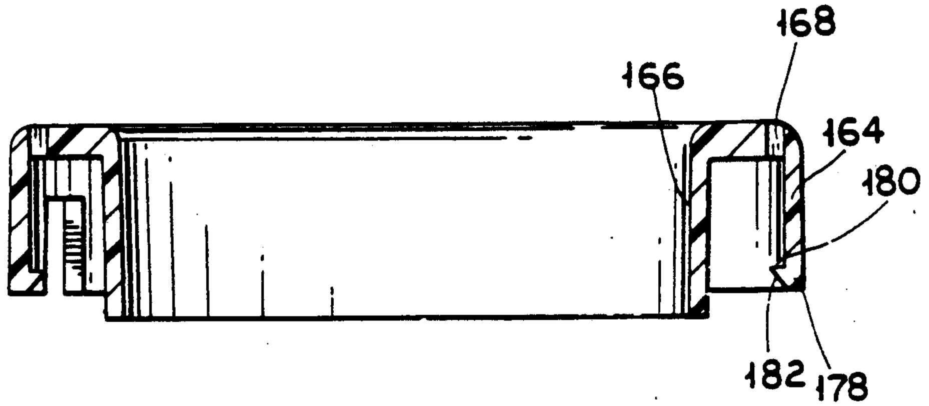
FIG. 10 shows a cross-sectional view taken along line 10—10 in FIG. 9.
Figure 12:
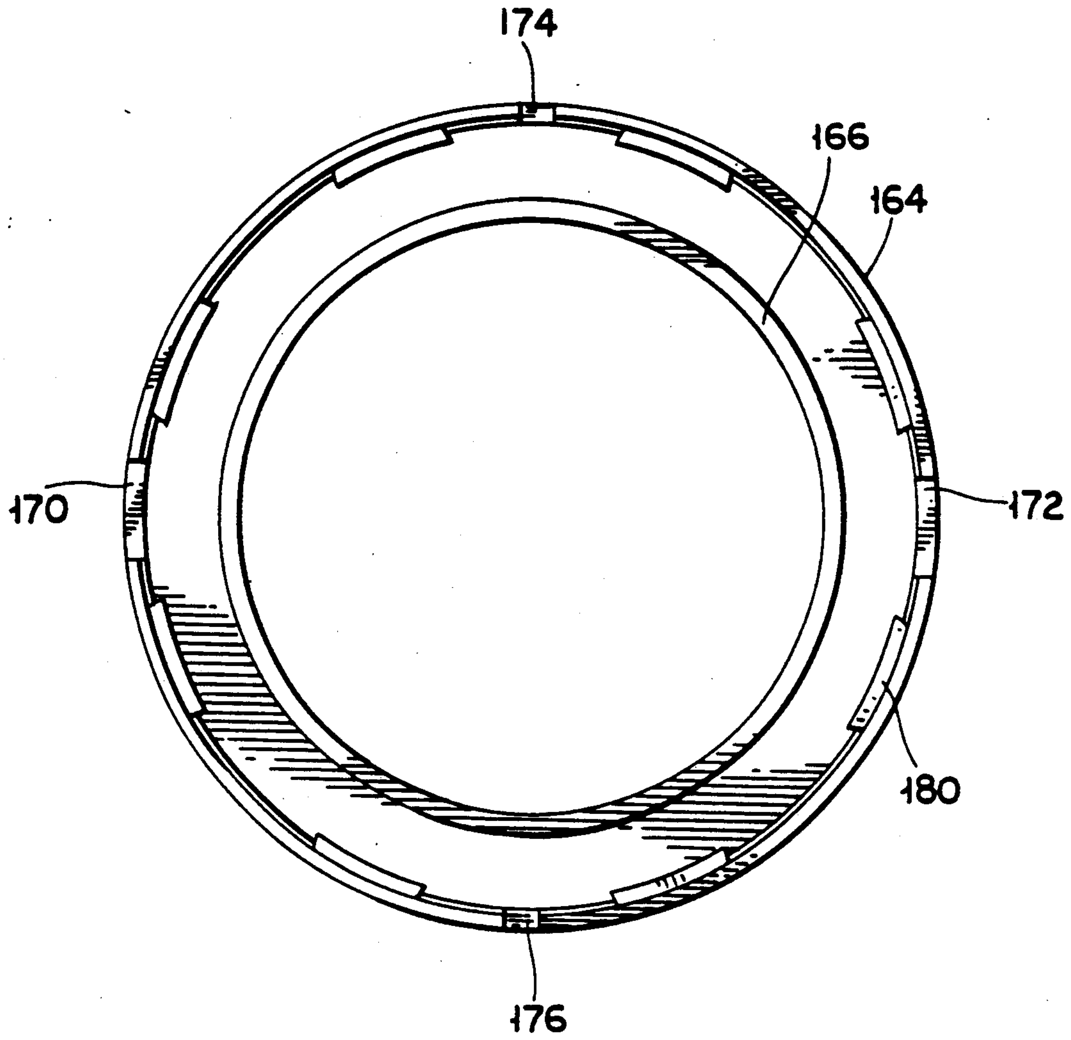
FIG. 12 shows a bottom view of the cap of FIGS. 9–11.
Figure 11:
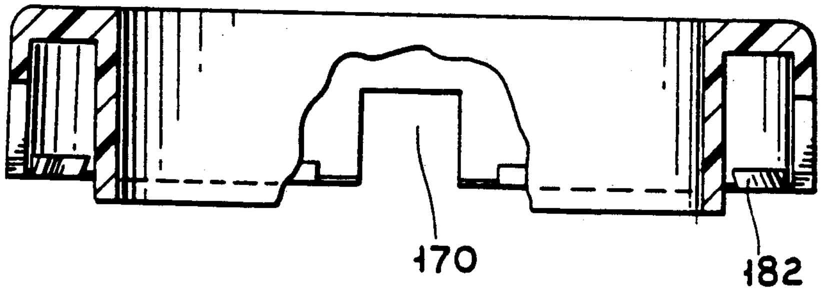
FIG. 11 shows a cross-sectional view of the cap taken along line 11—11 in FIG. 1.

Surrounding wall 124 of cup 112 there is a retaining ring 136 shown in more detail in FIGS. 6–8. Ring 136 has an upper portion 138 and a lower portion 140. Lower portion 140 has a smaller diameter than the upper portion to form a circumferential shoulder 144 therebetween. Upper portion 138 also has an outer cylindrical surface 146 which is slanted slightly, for example, at an angle of ½° with respect to vertical, i.e. with its lower end being radially inwardly with respect to the upper end. On this surface 146, there are two bosses 148, 150 each supporting a radial pin 152, 154.

Assembly 110 also includes a cap 160 shown in more detail in FIGS. 9–12. Cap 160 includes a disk-shaped top member 162. Extending downwardly from this member 162 there is an outer cylindrical member 164 and an inner cylindrical member 166. Member 164 is slanted slightly by an angle of about ½° in a manner similar to portion 138 of ring 136 as described above. At regular intervals around the top member 162, there are a plurality of angular cuts 168. Member 164 is provided with two diametrically opposed cut-outs 170, 172 having the same width as bosses 150, 152. Member 164 is further provided with two other cut-outs 174, 176 provided between cut-outs 170, 172. These latter cut-outs may be narrower since they are provided to make member 164 more flexible. Finally, at its bottom edge 178, member 164 is provided with a plurality of inwardly oriented teeth 180, each positioned under a corresponding cut 168. Each tooth 180 is defined by a wall 182 disposed at an angle of about 45°.

Ring 136 and cap 160 are preferably made of a relatively rigid material such as a polycarbonate plastic material.

The elements described above are assembled as follows. First cup 112 is inserted into the ring 136 so that rim 126 is resting on the ring. Cap 160 is then inserted over the cup 112 and snapped over the cup and the ring so that inner member 166 is disposed in groove 128, and teeth 180 are disposed below, and capture the ring 136 as shown in FIG. 3. The snapping action of the cap and the engagement between the cap and the ring is assisted by the matching slopes of member 164 and portion 138. The ring and the cap are shaped and sized so that the wall 124 of cup 112 is fictionally engaged therebetween. Bosses 148 and 150 extend through cut-outs 170, 172 provided for this purpose in cap 160.

Preferably, after the cup 112, ring 136 and cap 160 have been assembled as described above, whereby the cup is imparted some rigidity by the cap, an induction microphone or other similar inertial transducer 184 is secured to surface 116, for example, using an adhesive such as rubber cement. Wires 186 used for picking up electrical signals from microphone 184 are passed through hole 122. Of course, the microphone may also be secured to the cup 112 before the ring and the cap are installed over the cup 112. The completed microphone assembly 112 is then installed in a headgear as described for the embodiment of FIGS. 1 and 2. Importantly during the operation, the microphone is in effect floating with respect to the headgear due to the dampening action of the soft cup 112. Extraneous sound waves from the headgear therefore do not propagate, or at least are attenuated by the cup before they reach the microphone.

Obviously numerous modifications may be made to the invention without departing from its scope as defined in the appended claims.

We claim:

1. A microphone assembly for mounting in a head gear having a microphone cavity, said microphone assembly comprising:

microphone means for receiving vibrations by bone conduction, said vibrations corresponding to audio sounds produced by the wearer of said head gear, and for generating electrical signals corresponding to said vibrations;

housing means disposed between said microphone means;

mounting means for mounting said housing in said microphone cavity; and damper means disposed between said microphone means and said mounting means for suppressing mechanical vibrations from said head gear to said microphone means wherein said damper means consists of a damper ring coupled to said housing and made of a soft, resilient material and said mounting means consists of a pivot ring made of hard flexible material which fits into a groove in said damper ring.

2. The microphone assembly of claim 1 wherein said damper means and housing means cooperate to form a housing cavity for said microphone means.

3. The microphone assembly of claim 2 wherein said microphone means is secured to said housing means.

4. The microphone assembly of claim 3 wherein said microphone means includes a contact surface for contacting the cranial bones of said wearer, said contact surface protruding from said microphone cavity.

5. A microphone assembly for generating electrical signals corresponding to audio signals produced by a person comprising:

a microphone for receiving vibrations from said person and converting them into corresponding electrical energy signals;

support means arranged and constructed to hold said microphone in an intimate contact with said person's cranial bones for receiving vibrations corresponding to said audio signals by bone conduction;

head gear means;

mounting means for mounting said support means to said head gear means; and damper means disposed between said microphone means and mounting means for suppressing mechanical vibrations from said head gear means to said microphone means wherein said damper means consists of a damper ring coupled to said housing and made of a soft, resilient material and said mounting means consists of a pivot ring made of a hard flexible material which fits into a groove in said damper ring.

6. The microphone assembly of claim 5 wherein said head gear means includes a microphone cavity, and said mounting means mounts said support means in said microphone cavity.

7. A microphone assembly comprising:

a cylindrical housing including a housing cavity with disk-shaped base and interior housing sidewalls;

a microphone disposed in said housing cavity and adhesively secured to said disk shaped, and spaced radially away from said interior sidewalls;

a damper ring coupled to said housing and made of a soft, resilient material for damping extraneous noise wherein said damper ring is formed with an annular groove; and mounting means coupled to said damper ring for mounting said housing to a headgear worn by a person, said mounting means consists of a pivot ring disposed in said annular groove.

8. The microphone assembly of claim 7 comprising a rigid base adhesively secured to said microphone, a first rigid ring disposed axially on said base, said damper ring being axially mounted on said first rigid ring.

9. The microphone assembly of claim 8 further comprising a second rigid ring axially mounted on said damper ring.

10. The microphone assembly of claim 7 wherein said pivot ring is made of a hard flexible material.

* * * * *